United States Patent
Emori et al.

(10) Patent No.: US 9,840,572 B2
(45) Date of Patent: Dec. 12, 2017

(54) ACRYLIC RUBBER, ACRYLIC RUBBER COMPOSITION, CROSS-LINKED ACRYLIC RUBBER PRODUCT, AND SEAL MEMBER

(71) Applicants: ZEON CORPORATION, Tokyo (JP); HONDA MOTOR CO., LTD., Tokyo (JP)

(72) Inventors: Nobuyoshi Emori, Tokyo (JP); Tomonori Ogawa, Tokyo (JP); Takanori Arakawa, Tokyo (JP); Takayuki Kogure, Wako (JP); Kazutaka Yokoyama, Wako (JP); Ryosuke Kodaira, Wako (JP)

(73) Assignees: ZEON CORPORATION, Tokyo (JP); HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 15/320,203

(22) PCT Filed: Jul. 3, 2015

(86) PCT No.: PCT/JP2015/069292
§ 371 (c)(1),
(2) Date: Dec. 19, 2016

(87) PCT Pub. No.: WO2016/002936
PCT Pub. Date: Jan. 7, 2016

(65) Prior Publication Data
US 2017/0121439 A1    May 4, 2017

(30) Foreign Application Priority Data
Jul. 4, 2014  (JP) ................. 2014-138412

(51) Int. Cl.
C08F 220/18    (2006.01)
C08K 5/205    (2006.01)
C08K 5/378    (2006.01)
C09K 3/10    (2006.01)
F16J 15/02    (2006.01)
F16J 15/3284    (2016.01)

(52) U.S. Cl.
CPC ............ *C08F 220/18* (2013.01); *C08K 5/205* (2013.01); *C08K 5/378* (2013.01); *C09K 3/10* (2013.01); *F16J 15/022* (2013.01); *F16J 15/3284* (2013.01); *C08F 2220/1825* (2013.01); *C09K 2003/1068* (2013.01); *C09K 2003/1087* (2013.01); *C09K 2200/0607* (2013.01); *C09K 2200/0625* (2013.01)

(58) Field of Classification Search
CPC ............. C08F 220/12; C08F 2220/285; C08F 2800/20
See application file for complete search history.

(56) References Cited

U.S. PATENT DOCUMENTS

| | | | | |
|---|---|---|---|---|
| 4,822,654 | A * | 4/1989 | Takemura | ............... B32B 25/14 428/36.8 |
| 8,541,511 | B2 * | 9/2013 | Schmidt | .................... C08F 8/44 525/191 |
| 2008/0227905 | A1* | 9/2008 | Kumasaki | ........... C08F 293/005 524/505 |
| 2010/0323141 | A1* | 12/2010 | Kawasaki | ............. C08F 220/18 428/36.9 |

FOREIGN PATENT DOCUMENTS

| | | |
|---|---|---|
| JP | 2003-292719 A | 10/2003 |
| JP | 2004-231940 A | 8/2004 |
| JP | 2006-057000 A | 3/2006 |
| JP | 2006-219549 A | 8/2006 |
| JP | 2008-214418  * | 9/2008 |
| JP | 2008-214418 A | 9/2008 |
| WO | 2009/099113 A1 | 8/2009 |

OTHER PUBLICATIONS

Computer Transation of JP 2008-214418 (Sep. 2008).*
Oct. 6, 2015 International Search Report issued in International Patent Application No. PCT/JP2015/069292.
Jan. 10, 2017 International Preliminary Report on Patentability issued in International Patent Application No. PCT/JP2015/069292.

* cited by examiner

*Primary Examiner* — Robert C Boyle
(74) *Attorney, Agent, or Firm* — Oliff PLC

(57) ABSTRACT

An acrylic rubber contains (a) methyl methacrylate units, (b) ethyl acrylate units, (c) n-butyl acrylate units, (d) 2-methoxyethyl acrylate units, and (e) cross-linking site monomer units, in which the acrylic rubber contains 10 to 20% by weight of (a) the methyl methacrylate units, 15% by weight or less of (b) the ethyl acrylate units, 60 to 80% by weight of (c) the n-butyl acrylate units, 10 to 30% by weight of (d) the 2-methoxyethyl acrylate units, and 0.5 to 5% by weight of (e) the cross-linking site monomer units.

9 Claims, No Drawings

ACRYLIC RUBBER, ACRYLIC RUBBER COMPOSITION, CROSS-LINKED ACRYLIC RUBBER PRODUCT, AND SEAL MEMBER

TECHNICAL FIELD

The present invention relates to an acrylic rubber having excellent hydrolysis resistance and an excellent balance between oil resistance and cold resistance, an acrylic rubber composition using this acrylic rubber, and a cross-linked acrylic rubber product using this acrylic rubber composition. Further, the present invention relates to a seal member having excellent hydrolysis resistance and an excellent balance between oil resistance and cold resistance.

BACKGROUND ART

An acrylic rubber obtained by polymerizing an acrylic acid alkyl ester or polymerizing an acrylic acid alkyl ester and an acrylic acid alkoxyalkyl ester is known as a rubber having cold resistance according to an environment for use and having excellent oil resistance particularly at a high temperature. Therefore, demand for the acrylic rubber is increasing as a hose for automobiles, an oil seal for automobiles, an O-ring for automobiles, a conveyor belt incorporated in a device or a machine, or the like. In recent years, further improvement of performance of rubber parts has been demanded, for example, because thermal environmental conditions around an internal combustion engine have become severe due to high output of the internal combustion engine, countermeasures for exhaust gas, or the like, and an engine oil is used under a high temperature condition without being exchanged for a long time to promote deterioration thereof due to contact with heat, air, water, exhaust gas, or the like.

For example, Patent Literature 1 discloses an acrylic rubber obtained by copolymerizing an acrylic acid alkyl ester, a specific ratio of a methacrylic acid alkyl ester, and a specific ratio of a cross-linkable monomer. Further, Patent Literature 2 discloses an acrylic rubber including a methacrylic acid alkyl ester unit, an acrylic acid alkyl ester unit and/or an acrylic acid alkoxy ester unit, and a carboxy group-containing α,β-ethylenically unsaturated monomer unit in specific ratios.

CITATION LIST

Patent Literature

Patent Literature 1: WO 2009/099113 A
Patent Literature 2: JP 2008-214418 A

SUMMARY OF INVENTION

Technical Problem

Further, when the above rubber parts are seal members for automobiles in contact with an engine oil or the like (O-ring, gasket, or the like), the rubber parts are further deteriorated and hardened due to hydrolysis caused by contact with water and a metal salt such as zinc derived from various additives contained in the engine oil, and influence of heat or the like. Therefore, the rubber parts require to have hydrolysis resistance in addition to the oil resistance and cold resistance.

A first object of the present invention is to provide an acrylic rubber capable of obtaining a cross-linked acrylic rubber product having an excellent balance between oil resistance and cold resistance and further having excellent hydrolysis resistance, an acrylic rubber composition using this acrylic rubber, and a cross-linked acrylic rubber product using this acrylic rubber composition.

Further, a second object of the present invention is to provide a seal member having an excellent balance between oil resistance and cold resistance and further having excellent hydrolysis resistance.

The present inventors made intensive studies. As a result, the present inventors have found that the first object can be achieved by an acrylic rubber including a specific methacrylic acid alkyl ester unit, a specific acrylic acid alkyl ester unit, a specific acrylic acid alkoxy ester unit, and a cross-linking site monomer in specific ratios, and an acrylic rubber composition containing this acrylic rubber and a cross-linking agent, and have completed the present invention.

Further, the present inventors made intensive studies. As a result, the present inventors have found that the second object can be achieved by cross-linking the acrylic rubber composition containing an acrylic rubber including a specific methacrylic acid alkyl ester unit, a specific acrylic acid alkyl ester unit, a specific acrylic acid alkoxy ester unit, and a cross-linking site monomer in specific ratios, and a cross-linking agent, and have completed the present invention.

Solution to Problem

Therefore, the present invention provides:

(1) an acrylic rubber containing (a) methyl methacrylate units, (b) ethyl acrylate units, (c) n-butyl acrylate units, (d) 2-methoxyethyl acrylate units, and (e) cross-linking site monomer units, in which the acrylic rubber contains 10 to 20% by weight of (a) the methyl methacrylate units, 15% by weight or less of (b) the ethyl acrylate units, 60 to 80% by weight of (c) the n-butyl acrylate units, 10 to 30% by weight of (d) the 2-methoxyethyl acrylate units, and 0.5 to 5% by weight of (e) the cross-linking site monomer units;

(2) the acrylic rubber according to (1), in which the cross-linking site monomer has at least one of a carboxyl group, an active chlorine group, and an epoxy group;

(3) an acrylic rubber composition containing the acrylic rubber according to (1) or (2) and a cross-linking agent;

(4) the acrylic rubber composition according to (3), in which the cross-linking agent is a polyvalent amine compound or a triazine thiol derivative;

(5) a cross-linked acrylic rubber product obtained by cross-linking the acrylic rubber composition according to (3) or (4);

(6) a seal member formed of a cross-linked acrylic rubber product obtained by cross-linking an acrylic rubber composition containing an acrylic rubber containing (a) methyl methacrylate units, (b) ethyl acrylate units, (c) n-butyl acrylate units, (d) 2-methoxyethyl acrylate units, and (e) cross-linking site monomer units, in which the acrylic rubber contains 10 to 18% by weight of (a) the methyl methacrylate units, 5% by weight or less of (b) the ethyl acrylate units, 60 to 65% by weight of (c) the n-butyl acrylate units, 11 to 24% by weight of (d) the 2-methoxyethyl acrylate units, and 1 to 3% by weight of (e) the cross-linking site monomer units and a cross-linking agent, in which the seal member is used in an environment in contact with an oil for an engine containing 500 to 2000 ppm of water and 1000 to 5000 ppm of zinc;

(7) the seal member according to (6), in which the seal member is any one of a head cover gasket, a plug tube gasket, a cam journal orifice gasket, a spool valve gasket, an oil pressure sensor gasket, a cam shaft thrust gasket, a valve timing control valve gasket, a valve timing control filter gasket, a cylinder head plug gasket, an oil filter cartridge gasket, an oil filter base gasket, a baffle plate gasket, a gallery cap bolt gasket, a lower block orifice gasket, a positive crankcase ventilation valve gasket, an oil path orifice gasket, an oil level pipe gasket, an oil pump gasket, a chain case gasket, an oil filter gasket, an oil cooler gasket, and an oil pan gasket;

(8) the seal member according to (6) or (7), in which the cross-linking site monomer has at least one of a carboxyl group, an active chlorine group, and an epoxy group; and (9) the seal member according to any one of (6) to (8), in which the cross-linking agent is a polyvalent amine compound or a triazine thiol derivative.

Advantageous Effects of Invention

An acrylic rubber of the present invention can provide a cross-linked acrylic rubber product having an excellent balance between oil resistance and cold resistance and further having excellent hydrolysis resistance. Further, the present invention can provide an acrylic rubber composition using the acrylic rubber and a cross-linked acrylic rubber product using the acrylic rubber composition.

Further, a seal member of the present invention has an excellent balance between oil resistance and cold resistance and further has excellent hydrolysis resistance.

DESCRIPTION OF EMBODIMENTS

An acrylic rubber of the present invention contains (a) methyl methacrylate units, (b) ethyl acrylate units, (c) n-butyl acrylate units, (d) 2-methoxyethyl acrylate units, and (e) cross-linking site monomer units. The acrylic rubber contains 10 to 20% by weight of (a) the methyl methacrylate units, 15% by weight or less of (b) the ethyl acrylate units, 60 to 80% by weight of (c) the n-butyl acrylate units, 10 to 30% by weight of (d) the 2-methoxyethyl acrylate units, and 0.5 to 5% by weight of (e) the cross-linking site monomer units.

Further, a seal member of the present invention is formed of a cross-linked acrylic rubber product obtained by cross-linking an acrylic rubber composition containing an acrylic rubber containing (a) methyl methacrylate units, (b) ethyl acrylate units, (c) n-butyl acrylate units, (d) 2-methoxyethyl acrylate units, and (e) cross-linking site monomer units, in which the acrylic rubber contains 10 to 18% by weight of (a) the methyl methacrylate units, 5% by weight or less of (b) the ethyl acrylate units, 60 to 65% by weight of (c) the n-butyl acrylate units, 11 to 24% by weight of (d) the 2-methoxyethyl acrylate units, and 1 to 3% by weight of (e) the cross-linking site monomer units, and a cross-linking agent. The seal member is used in an environment in contact with an oil for an engine containing 500 to 2000 ppm of water and 1000 to 5000 ppm of zinc.

Note that, in the present invention, an oil for an engine means a concept including all oils generally used in an engine, such as a so-called engine oil which is a lubricating oil, a fuel oil such as gasoline, or a mixture thereof. Zinc included in an oil for an engine means a concept including a zinc ion and a metal salt of zinc.

(Acrylic Rubber)

Hereinafter, the acrylic rubber of the present invention will be described. The acrylic rubber of the present invention contains (a) methyl methacrylate units, (b) ethyl acrylate units, (c) n-butyl acrylate units, (d) 2-methoxyethyl acrylate units, and (e) cross-linking site monomer units. The acrylic rubber contains 10 to 20% by weight, preferably 10 to 18% by weight of (a) the methyl methacrylate units, 15% by weight or less, preferably 5% by weight or less of (b) the ethyl acrylate units, 60 to 80% by weight, preferably 60 to 74% by weight, more preferably 60 to 65% by weight of (c) the n-butyl acrylate units, 10 to 30% by weight, preferably 11 to 24% by weight of (d) the 2-methoxyethyl acrylate units, and 0.5 to 5% by weight, preferably 1 to 3% by weight of (e) the cross-linking site monomer units.

Further, when the acrylic rubber of the present invention is used for a seal member used in an environment in contact with an oil for an engine containing 500 to 2000 ppm of water and 1000 to 5000 ppm of zinc, an acrylic rubber containing (a) methyl methacrylate units, (b) ethyl acrylate units, (c) n-butyl acrylate units, (d) 2-methoxyethyl acrylate units, and (e) cross-linking site monomer units, in which the acrylic rubber contains 10 to 18% by weight of (a) the methyl methacrylate units, 5% by weight or less of (b) the ethyl acrylate units, 60 to 65% by weight of (c) the n-butyl acrylate units, 11 to 24% by weight of (d) the 2-methoxyethyl acrylate units, and 1 to 3% by weight of (e) the cross-linking site monomer units is preferably used. When a seal member formed of a cross-linked acrylic rubber product obtained by cross-linking the acrylic rubber having a composition in the above range is used in an environment in contact with an oil for an engine containing 500 to 2000 ppm of water and 1000 to 5000 ppm of zinc, the seal member has a specifically excellent balance between oil resistance and cold resistance, and further has excellent hydrolysis resistance.

Note that, even when the amount of water and the amount of zinc included in the oil for an engine in contact with the seal member are outside the above ranges, the seal member of the present invention has an excellent balance between oil resistance and cold resistance, and further has excellent hydrolysis resistance. However, when the amount of water and the amount of zinc included in the oil for an engine in contact with the seal member are within the above ranges, the seal member of the present invention has a specifically excellent balance between oil resistance and cold resistance, and further has excellent hydrolysis resistance.

In the present invention, (a) a methyl methacrylate unit is used as the specific methacrylic acid alkyl ester unit, (b) an ethyl acrylate unit and (c) an n-butyl acrylate unit are used as the specific acrylic acid alkyl ester unit, and (d) a 2-methoxyethyl acrylate unit is used as the specific acrylic acid alkoxy ester unit.

When the amount of (a) the methyl methacrylate unit is too small, hydrolysis resistance of a resulting cross-linked acrylic rubber product is lowered. When the amount of each of (b) the ethyl acrylate unit and (d) the 2-methoxyethyl acrylate unit is too large, hydrolysis resistance of a resulting cross-linked acrylic rubber product is deteriorated. On the other hand, when the amount of (d) the 2-methoxyethyl acrylate unit is too small, oil resistance of a resulting cross-linked acrylic rubber product is deteriorated.

Further, when the amount of (e) the cross-linking site monomer unit is too large, a resulting cross-linked acrylic rubber product is hard. Further, when the amount of (e) the cross-linking site monomer unit is too small, strength of a resulting cross-linked acrylic rubber product is insufficient.

Further, the acrylic rubber of the present invention is usually obtained by copolymerizing a monomer composition consisting of (A) a methyl methacrylate, (B) an ethyl acrylate, (C) an n-butyl acrylate, (D) a 2-methoxyethyl acrylate, and (E) a cross-linking site monomer.

As the cross-linking site monomer, a monomer copolymerizable with (A) the methyl methacrylate, (B) the ethyl acrylate, (C) the n-butyl acrylate, and (D) the 2-methoxyethyl acrylate and capable of introducing a cross-linking site used in forming a cross-linked acrylic rubber product can be used without any particular limitation. However, examples of the cross-linking site monomer include a cross-linking site monomer having an epoxy group, a cross-linking site monomer having an active chlorine group, and a cross-linking site monomer having a carboxyl group.

Examples of the cross-linking site monomer having a carboxyl group include a carboxyl group-containing α,β-ethylenically unsaturated monomer. Examples of the carboxyl group-containing α,β-ethylenically unsaturated monomer include α,β-ethylenically unsaturated monocarboxylic acid, α,β-ethylenically unsaturated polyvalent carboxylic acid, α,β-ethylenically unsaturated polyvalent carboxylic acid anhydride, and α,β-ethylenically unsaturated polyvalent carboxylic acid partial ester.

Examples of the α,β-ethylenically unsaturated monocarboxylic acid include acrylic acid, methacrylic acid, ethyl acrylic acid, and crotonic acid.

Examples of the α,β-ethylenically unsaturated polyvalent carboxylic acid include fumaric acid, maleic acid, itaconic acid, and citraconic acid.

Examples of the α,β-ethylenically unsaturated polyvalent carboxylic acid anhydride include maleic anhydride and itaconic anhydride.

Examples of the α,β-ethylenically unsaturated polyvalent carboxylic acid partial ester include a butenedionic acid monoester such as monomethyl fumarate, mono-n-butyl fumarate, monoethyl maleate, mono-n-butyl maleate, mono-cyclopentyl fumarate, mono-cyclohexyl fumarate, or mono-cyclohexenyl maleate; and an itaconic acid monoester such as monoethyl itaconate or mono-n-butyl itaconate.

These may be used alone, or may be used in combination of two or more kinds thereof. Among them, as the cross-linking site monomer having a carboxyl group, the α,β-ethylenically unsaturated polyvalent carboxylic acid partial ester is preferable, butenedionic acid monoester is more preferable, and mono-n-butyl fumarate is particularly preferable.

Examples of the cross-linking site monomer having an active chlorine group include 2-chloroethyl acrylate, 2-chloroethyl vinyl ether, vinyl chloroacetate, allyl chloroacetate, vinylbenzyl chloride, chloromethyl vinyl ketone, and 5-chloromethyl-2-norbornene. Among them, as the cross-linking site monomer having an active chlorine group, vinyl chloroacetate is preferable.

In addition, examples of the cross-linking site monomer having an epoxy group include glycidyl acrylate, glycidyl methacrylate, allyl glycidyl ether, and methallyl glycidyl ether.

The acrylic rubber of the present invention may contain other monomer units copolymerizable with the above monomers (also referred to as "other monomer unit") as long as an object of the present invention is not essentially impaired.

Examples of such copolymerizable other monomers include an aromatic vinyl monomer such as styrene, α-methyl styrene, vinyl benzyl chloride, and divinylbenzene; an α,β-ethylenically unsaturated nitrile monomer such as acrylonitrile and methacrylonitrile; a monomer having two or more (meth)acryloyloxy groups (polyfunctional acryl monomer), such as a (meth)acrylic acid diester of ethylene glycol and a (meth)acrylic acid diester of propylene glycol; 3,4-epoxy-1-butene, 1,2-epoxy-3-pentene, 1,2-epoxy-5,9-cyclododecadiene, 2-hydroxyethyl (meth)acrylic acid, 2-hydroxypropyl (meth)acrylic acid, 3-hydroxypropyl (meth)acrylic acid, (meth)acrylamide, N-hydroxy (meth)acrylamide, ethylene, propylene, vinyl acetate, ethyl vinyl ether, and butyl vinyl ether. These monomers may be used alone, or may be used in combination of two or more kinds thereof. Note that, in the present specification, "(meth)acryl" means "acryl" and "methacryl."

A content of the other monomer unit in the acrylic rubber of the present invention is preferably 10% by weight or less, more preferably 5% by weight or less, and it is particularly preferable that the acrylic rubber does not contain any other monomer unit.

The acrylic rubber of the present invention can be manufactured by polymerizing a monomer mixture containing (A) the methyl methacrylate, (B) the ethyl acrylate, (C) the n-butyl acrylate, (D) the 2-methoxyethyl acrylate, (E) the cross-linking site monomer, and other monomers by using a known method such as emulsion polymerization, suspension polymerization, solution polymerization, or bulk polymerization. Among them, an emulsion polymerization method under normal pressure can be preferably employed due to easy control of a polymerization reaction or the like.

The total amount of all the kinds of the above monomers are not necessarily required to be supplied to a place of a reaction at the beginning of the reaction, but may be added continuously or intermittently throughout the reaction time considering a copolymerization reactivity ratio, a reaction conversion ratio, and the like, or may be introduced at once or dividedly in the middle of the reaction or in the latter half of the reaction.

A charging ratio of each of the above monomers in the polymerization reaction is required to be adjusted depending on a reactivity of each of the monomers. However, the polymerization reaction proceeds almost quantitatively, and therefore the charging ratio is only required to be matched with a desired monomer unit composition of an acrylic rubber.

A Mooney viscosity (ML 1+4, 100° C.) of the acrylic rubber of the present invention is preferably 10 to 90, more preferably 15 to 80, and particularly preferably 20 to 70. When the Mooney viscosity is too small, moldability of an acrylic rubber composition may be lowered due to a decrease in a shape retention property thereof, or tensile strength of a cross-linked rubber product may be lowered. On the other hand, when the Mooney viscosity is too large, moldability of an acrylic rubber composition may be lowered due to a decrease in fluidity thereof.

(Acrylic Rubber Composition)

The acrylic rubber composition of the present invention contains the above-mentioned acrylic rubber and a cross-linking agent.

(Cross-Linking Agent)

The cross-linking agent is not particularly limited as long as it forms a cross-linking structure by a reaction with (e) the cross-linking site monomer unit acting as a cross-linking site in the acrylic rubber.

When the cross-linking site monomer (E) for introducing (e) the cross-linking site monomer unit is a cross-linking site monomer having a carboxyl group, a cross-linking agent for a carboxyl group can be used. Examples of the cross-linking agent for a carboxyl group include a polyvalent amine compound, a polyvalent hydrazide compound, a polyvalent epoxy compound, a polyvalent isocyanate compound, and an aziridine compound.

The polyvalent amine compound preferably has 4 to 30 carbon atoms. Examples of such a polyvalent amine compound include an aliphatic polyvalent amine compound and an aromatic polyvalent amine compound, but do not include a compound having a nonconjugated nitrogen-carbon double bond, such as a guanidine compound.

Examples of the aliphatic polyvalent amine compound include hexamethylene diamine, hexamethylenediamine carbamate, and N,N'-dicinnamylidene-1,6-hexanediamine. These may be used alone, or may be used in combination of two or more kinds thereof.

Examples of the aromatic polyvalent amine compound include 4,4'-methylene dianiline, m-phenylenediamine, 4,4'-diaminodiphenyl ether, 3,4'-diaminodiphenyl ether, 4,4'-(m-phenylene diisopropylidene) dianiline, 4,4'-(p-phenylene diisopropylidene) dianiline, 2,2'-bis[4-(4-aminophenoxy) phenyl] propane, 4,4'-diamino benzanilide, 4,4'-bis(4-aminophenoxy) biphenyl, m-xylylenediamine, p-xylylenediamine, and 1,3,5-benzenetriamine. These may be used alone, or may be used in combination of two or more kinds thereof.

Examples of the polyvalent hydrazide compound include oxalic acid dihydrazide, malonic acid dihydrazide, succinic acid dihydrazide, glutaric acid dihydrazide, adipic acid dihydrazide, pimelic acid dihydrazide, suberic acid dihydrazide, azelaic acid dihydrazide, sebacic acid dihydrazide, dodecanedioic acid dihydrazide, phthalic acid dihydrazide, isophthalic acid dihydrazide, terephthalic acid dihydrazide, 2,6-naphthalene dicarboxylic acid dihydrazide, naphthalic acid dihydrazide, acetone dicarboxylic acid dihydrazide, fumaric acid dihydrazide, maleic acid dihydrazide, itaconic acid dihydrazide, trimellitic acid dihydrazide, 1,3,5-benzenetricarboxylic acid dihydrazide, pyromellitic acid dihydrazide, and aconitic acid dihydrazide. These may be used alone, or may be used in combination of two or more kinds thereof.

Examples of the polyvalent epoxy compound include a compound having two or more epoxy groups in a molecule thereof, such as a glycidyl ether-type epoxy compound including a phenol novolak-type epoxy compound, a cresol novolak-type epoxy compound, a cresol-type epoxy compound, a bisphenol A-type epoxy compound, a bisphenol F-type epoxy compound, a brominated bisphenol A-type epoxy compound, a brominated bisphenol F-type epoxy compound, and a hydrogenated bisphenol A-type epoxy compound; or another polyvalent epoxy compound including an alicyclic epoxy compound, a glycidyl ester-type epoxy compound, a glycidyl amine-type epoxy compound, and an isocyanurate-type epoxy compound. These may be used alone, or may be used in combination of two or more kinds thereof.

As the isocyanate compound, diisocyanates and triisocyanates having 6 to 24 carbon atoms are preferable. Specific examples of the diisocyanates include 2,4-tolylene diisocyanate (2,4-TDI), 2,6-tolylene diisocyanate (2,6-TDI), 4,4'-diphenylmethane diisocyanate (MDI), hexamethylene diisocyanate, p-phenylene diisocyanate, m-phenylene diisocyanate, and 1,5-naphthylene diisocyanate. Specific examples of the triisocyanates include 1,3,6-hexamethylene triisocyanate, 1,6,11-undecane triisocyanate, and bicycloheptane triisocyanate. These can be used alone, or can be used in combination of two or more kinds thereof.

Examples of the aziridine compound include tris-2,4,6 (1-aziridinyl)-1,3,5-triazine, tris[1-(2-methyl) aziridinyl] phosphine oxide, and hexa[1-(2-methyl) aziridinyl] triphosphatriazine. These can be used alone, or can be used in combination of two or more kinds thereof.

Among the cross-linking agents for a carboxyl group, a polyvalent amine compound and a polyvalent hydrazide compound can be preferably used, the polyvalent amine compound can be more preferably used, and an aliphatic diamine and an aromatic diamine can be particularly preferably used. Among the aliphatic diamines, hexamethylenediamine carbamate is preferable. Among the aromatic diamines, 2,2'-bis[4-(4-aminophenoxy) phenyl] propane is preferable.

Further, when the cross-linking site monomer (E) for introducing (e) the cross-linking site monomer unit is a cross-linking site monomer having an active chlorine group, a cross-linking agent for an active chlorine group can be used. Examples of the cross-linking agent for an active chlorine group include: a triazine thiol derivative such as trithiocyanuric acid and 2,4,6-trimercapto-s-triazine; an organic carboxylic acid ammonium salt such as ammonium benzoate and ammonium adipate; a metal soap and sulfur. Among the cross-linking agents for an active chlorine group, a triazine thiol derivative can be preferably used, and 2,4,6-trimercapto-s-triazine can be more preferably used.

Further, when the cross-linking site monomer (E) for introducing (e) the cross-linking site monomer unit is a cross-linking site monomer having an epoxy group, a cross-linking agent for an epoxy group can be used. Examples of the cross-linking agent for an epoxy group include: ammonium benzoate; a dithiocarbamate; a polyamine and a derivative thereof; imidazoles; polycarboxylic acid and a quaternary ammonium salt, or polycarboxylic acid and a quaternary phosphonium salt.

A content of the cross-linking agent in the acrylic rubber composition of the present invention is preferably 0.05 to 20 parts by weight, more preferably 0.1 to 10 parts by weight, and particularly preferably 0.2 to 7 parts by weight with respect to 100 parts by weight of the acrylic rubber. When the content of the cross-linking agent is too small, cross-linking is insufficient, and it may be difficult to maintain a shape of a cross-linked acrylic rubber product. On the other hand, when the content of the cross-linking agent is too large, a cross-linked acrylic rubber product may be too hard, and elasticity thereof may be impaired.

Further, the acrylic rubber composition of the present invention may contain an additive such as a cross-linking accelerator, a processing aid, an anti-aging agent, a light stabilizer, a plasticizer, a reinforcing agent (for example, carbon black, silica, or calcium carbonate), a slip agent, a silane coupling agent, a tackifier, a lubricant, a flame retardant, an antifungal agent, an antistatic agent, a coloring agent, or a filler, if necessary.

Further, the acrylic rubber composition of the present invention preferably further contains a cross-linking accelerator.

The cross-linking accelerator is not particularly limited. However, when the cross-linking site monomer (E) for introducing (e) the cross-linking site monomer unit is a cross-linking site monomer having a carboxyl group and the cross-linking agent is a polyvalent amine compound, preferable examples of the cross-linking accelerator include an aliphatic monovalent secondary amine compound, an aliphatic monovalent tertiary amine compound, a guanidine compound, an imidazole compound, a quaternary onium salt, a tertiary phosphine compound, an alkali metal salt of a weak acid, and a diazabicycloalkene compound. These cross-linking accelerators can be used alone, or can be used in combination of two or more kinds thereof.

The aliphatic monovalent secondary amine compound is obtained by replacing two hydrogen atoms of ammonia with aliphatic hydrocarbon groups. The aliphatic hydrocarbon group to be replaced with the hydrogen atom preferably has 1 to 30 carbon atoms, and more preferably has 8 to 20 carbon atoms. Specific examples of the aliphatic monovalent secondary amine compound include dimethylamine, diethylamine, di-n-propylamine, diallylamine, diisopropylamine, di-n-butylamine, di-t-butylamine, di-sec-butylamine, dihexylamine, diheptylamine, dioctylamine, dinonylamine, didecylamine, diundecylamine, didodecylamine, ditridecylamine, ditetradecylamine, dipentadecylamine, dicetylamine, di-2-ethylhexylamine, dioctadecylamine, di-cis-9-octadecenylamine, and dinonadecylamine. Among them, dioctylamine, didecylamine, didodecylamine, ditetradecylamine, dicetylamine, dioctadecylamine, di-cis-9-octadecenylamine, dinonadecylamine, and the like are preferable.

The aliphatic monovalent tertiary amine compound is obtained by replacing all the three hydrogen atoms of ammonia with aliphatic hydrocarbon groups. The aliphatic hydrocarbon group to be replaced with the hydrogen atom preferably has 1 to 30 carbon atoms, and more preferably has 1 to 22 carbon atoms. Specific examples of the aliphatic monovalent tertiary amine compound include trimethylamine, triethylamine, tri-n-propylamine, triallylamine, tri-isopropylamine, tri-n-butylamine, tri-t-butylamine, tri-sec-butylamine, trihexylamine, triheptylamine, trioctylamine, trinonylamine, tridecylamine, triundecylamine, tridodecylamine, tritridecylamine, tritetradecylamine, tripentadecylamine, tricetylamine, tri-2-ethylhexylamine, trioctadecylamine, tri-cis-9-octadecenylamine, trinonadecylamine, N,N-dimethyldecylamine, N,N-dimethyldodecylamine, N,N-dimethyltetradecylamine, N,N-dimethylcetylamine, N,N-dimethyloctadecylamine, N,N-dimethylbehenylamine, N-methyldidecylamine, N-methyldidodecylamine, N-methylditetradecylamine, N-methyldicetylamine, N-methyldioctadecylamine, N-methyldibehenylamine, and dimethylcyclohexylamine. Among them, N,N-dimethyldodecylamine, N,N-dimethyltetradecylamine, N,N-dimethylcetylamine, N,N-dimethyloctadecylamine, N,N-dimethylbehenylamine, and the like are preferable.

Specific examples of the guanidine compound include 1,3-di-o-tolyl guanidine and 1,3-diphenyl guanidine. 1,3-di-o-tolyl guanidine is preferable.

Specific examples of the imidazole compound include 2-methyl imidazole and 2-phenyl imidazole.

Specific examples of the quaternary onium salt include tetra-n-butylammonium bromide and octadecyl tri-n-butylammonium bromide.

Specific examples of the tertiary phosphine compound include triphenylphosphine and tri-p-tolyl phosphine.

Specific examples of the alkali metal salt of a weak acid include an inorganic weak acid salt such as sodium phosphate, potassium phosphate, sodium carbonate, or potassium carbonate, and an organic weak acid salt such as sodium stearate, potassium stearate, sodium laurate, or potassium laurate.

Specific examples of the diazabicycloalkene compound include 1,8-diazabicyclo [5.4.0] undec-7-ene (DBU) and 1,5-diazabicyclo [4.3.0] non-5-ene (DBN).

In addition, when the cross-linking site monomer (E) for introducing (e) the cross-linking site monomer unit is a cross-linking site monomer having an active chlorine group and the cross-linking agent is sulfur, preferable examples of the cross-linking accelerator include fatty acid metal soap.

Further, when the cross-linking site monomer (E) for introducing (e) the cross-linking site monomer unit is a cross-linking site monomer having an active chlorine group and the cross-linking agent is a triazine thiol derivative, preferable examples of the cross-linking accelerator include a dithiocarbamate and a derivative thereof, a thiourea compound, and a thiuram sulfide compound. These cross-linking accelerators can be used alone, or can be used in combination of two or more kinds thereof.

Specific examples of the fatty acid metal soap include sodium stearate, potassium stearate, potassium oleate, sodium laurate, and sodium 2-ethylhexanoate.

Specific examples of the dithiocarbamate and a derivative thereof include a dithiocarbamic acid metal salt such as zinc dimethyldithiocarbamate, zinc diethyldithiocarbamate, zinc dibutyldithiocarbamate, zinc methylbenzyl dithiocarbamate, zinc dibenzyl dithiocarbamate, zinc methylcyclohexyl dithiocarbamate, zinc N-pentamethylene dithiocarbamate, copper dimethyldithiocarbamate, lead dimethyldithiocarbamate, cadmium dimethyldithiocarbamate, bismuth dimethyldithiocarbamate, ferric dimethyldithiocarbamate, tellurium dimethyldithiocarbamate, or selenium dimethyldithiocarbamate; and a complex salt of a dithiocarbamic acid metal salt and an amine such as dibutylamine or cyclohexylethylamine, and a double salt thereof. Among them, a dithiocarbamate which uses zinc is preferable, and zinc dibutyldithiocarbamate is more preferable.

Specific examples of the thiourea compound include diphenyl thiourea, diethyl thiourea, dibutyl thiourea, di-o-tolyl thiourea, trimethyl thiourea, and ethylene thiourea. Among them, diethyl thiourea is preferable.

Specific examples of the thiuram sulfide compound include tetramethylthiuram monosulfide, tetramethylthiuram disulfide, tetraethylthiuram disulfide, tetra-n-butylthiuram disulfide, and di-pentamethylenethiuram tetrasulfide.

Further, when the cross-linking site monomer (E) for introducing (e) the cross-linking site monomer unit is a cross-linking site monomer having an epoxy group and the cross-linking agent is a dithiocarbamate, preferable examples of the cross-linking accelerator include a dithiocarbamate other than the dithiocarbamate used as the cross-linking agent. For example, when zinc dithiocarbamate is used as the cross-linking agent, ferric dithiocarbamate is preferable as the cross-linking accelerator. These cross-linking accelerators can be used alone, or can be used in combination of two or more kinds thereof.

A use amount of the cross-linking accelerator is preferably 0.1 to 20 parts by weight, more preferably 0.2 to 15 parts by weight, and particularly preferably 0.3 to 10 parts by weight with respect to 100 parts by weight of the acrylic rubber. When the amount of the cross-linking accelerator is too large, a cross-linking speed may be too high during cross-linking, a bloom of the cross-linking accelerator may be generated on a surface of a cross-linked product, or the cross-linked product may be too hard. When the amount of the cross-linking accelerator is too small, tensile strength of a cross-linked product may be lowered significantly.

Further, a polymer such as a rubber other than the acrylic rubber of the present invention, an elastomer, or a resin may be added to the acrylic rubber composition of the present invention, if necessary.

Examples of the elastomer include an olefin-based elastomer, a styrene-based elastomer, a polyester-based elastomer, a polyamide-based elastomer, a polyurethane-based elastomer, and a polysiloxane-based elastomer.

Examples of the resin include an olefin-based resin, a styrene-based resin, an acrylic-based resin, polyphenylene ether, polyester, polycarbonate, and polyamide.

As a method for preparing an acrylic rubber composition, a mixing method such as roll mixing, Banbury mixing, screw mixing, and solution mixing can be employed appropriately. A blending order is not particularly limited. However, it may be required to mix components sufficiently which are resistant to reaction or decomposition by heat and then to mix components which easily react or decomposite by heat (for example, a cross-linking agent or a cross-linking accelerator) at a temperature at which the reaction or decomposition will not occur in a short time.

(Cross-Linked Acrylic Rubber Product)

The cross-linked acrylic rubber product of the present invention is obtained by cross-linking the above-mentioned acrylic rubber composition.

Cross-linking is usually performed by heating the acrylic rubber composition. As cross-linking conditions, a cross-linking temperature is preferably 130 to 220° C., and more preferably 140° C. to 200° C., and cross-linking time is preferably 30 seconds to two hours, and more preferably one minute to one hour. This cross-linking at a first step is also referred to as primary cross-linking.

Examples of a molding method for obtaining a cross-linked acrylic rubber product having a desired shape include a conventionally known molding method such as extrusion molding, injection molding, transfer molding, and compression molding. Of course, cross-linking can be performed by heating at the same time as molding.

Further, a cross-linked acrylic rubber product molded into a desired shape can be used as the seal member of the present invention.

For extrusion molding, general procedures for processing a rubber can be employed. That is, a long-length extrusion molded product having a desired cross sectional shape (a plate, a rod, a pipe, a hose, a deformed article, or the like) is obtained by supplying a rubber composition prepared by roll mixing or the like to a feed port of an extruder, softening the rubber composition by heating from a barrel in a process of sending the rubber composition to a head portion with a screw, and causing the rubber composition to pass through a die having a predetermined shape and disposed in the head portion.

In injection molding, transfer molding, and compression molding, shaping can be performed by filling a cavity of a mold having a shape of one product or several products with the acrylic rubber composition of the present invention. By heating this mold, shaping and cross-linking can be performed almost simultaneously.

In addition to the above-mentioned primary cross-linking, secondary cross-linking can be performed, if necessary, by heating this cross-linked acrylic rubber product in an oven or the like using electricity, hot air, steam, or the like as a heat source at 130° C. to 220° C., preferably at 140° C. to 200° C. for 1 to 48 hours.

The cross-linked acrylic rubber product of the present invention has a basic characteristic as an acrylic rubber, such as tensile strength, elongation, or hardness. In addition, the cross-linked acrylic rubber product has an excellent balance between oil resistance and cold resistance, and further has excellent hydrolysis resistance. Therefore, for example, the cross-linked acrylic rubber product of the present invention can be used suitably for a seal member and the like in contact with an oil for an engine or the like.

Further, the seal member of the present invention is used in an environment in contact with a predetermined mixed liquid. Specifically, the seal member is used in an environment in contact with an oil for an engine containing water and zinc. For example, it is possible to suppress deterioration of the seal member due to hydrolysis caused by contact with water and a metal salt such as zinc derived from various additives contained in the oil for an engine and influence of heat or the like.

Here, a content of water contained in the oil for an engine in contact with the seal member is 500 to 2000 ppm, and a content of zinc contained in the oil for an engine in contact with the seal member is 1000 to 5000 ppm.

Specifically when the contents of water and zinc contained in the oil for an engine in contact with the seal member are within the above ranges, the seal member of the present invention has an excellent balance between oil resistance and cold resistance, and further has excellent hydrolysis resistance by using a specific cross-linked acrylic rubber product specified in the seal member of the present invention. Even when the contents of water and zinc contained in the oil for an engine in contact with the seal member are outside the above ranges, the seal member of the present invention has an excellent balance between oil resistance and cold resistance, and further has excellent hydrolysis resistance. On the other hand, when the contents of water and zinc contained in the oil for an engine in contact with the seal member are within the above ranges, the seal member of the present invention has an excellent balance between oil resistance and cold resistance, and further has excellent hydrolysis resistance only by using a specific cross-linked acrylic rubber product specified in the seal member of the present invention.

The seal member of the present invention has a basic characteristic as an acrylic rubber, such as tensile strength, elongation, or hardness. In addition, the seal member has an excellent balance between oil resistance and cold resistance, and further has excellent hydrolysis resistance. Therefore, the seal member of the present invention can be used suitably for a seal member used in an environment in contact with an oil for an engine (particularly an oil for an engine containing water, zinc derived from various additives, and the like). Specifically, the seal member can be used suitably for a head cover gasket, a plug tube gasket, a cam journal orifice gasket, a spool valve gasket, an oil pressure sensor gasket, a cam shaft thrust gasket, a valve timing control valve gasket, a valve timing control filter gasket, a cylinder head plug gasket, an oil filter cartridge gasket, an oil filter base gasket, a baffle plate gasket, a gallery cap bolt gasket, a lower block orifice gasket, a positive crankcase ventilation valve gasket, an oil path orifice gasket, an oil level pipe gasket, an oil pump gasket, a chain case gasket, an oil filter gasket, an oil cooler gasket, and an oil pan gasket.

EXAMPLES

Hereinafter, the present invention will be described more specifically by indicating Examples. Hereinafter, "part" and "%" are based on a weight unless otherwise particularly specified. However, the present invention is not limited only to Examples. Tests of characteristics and evaluation thereof were performed as follows.

Note that, in the following hydrolysis resistance test, an acceleration test using a test liquid containing only water and zinc was performed without using an engine oil. However, even when a test liquid containing water, zinc, and an engine oil was used, cross-linked acrylic rubber products obtained in Examples exhibit hydrolysis resistance similar to a case where the acceleration test was performed.

(1) Mooney Viscosity (ML 1+4, 100° C.)

A Mooney viscosity of an acrylic rubber was measured at a measurement temperature of 100° C. in accordance with a Mooney viscosity test of uncross-linked rubber physical testing methods prescribed in JIS K6300.

(2) Normal Physical Properties (Tensile Strength, Elongation, Hardness)

Each of acrylic rubber compositions obtained in Examples and Comparative Example was put in a mold having a vertical length of 15 cm, a horizontal length of 15 cm, and a depth of 0.2 cm, and was pressed at 170° C. for 20 minutes while being pressurized at a press pressure of 10 MPa to obtain a sheet-like cross-linked acrylic rubber product. Subsequently, the resulting sheet-like cross-linked acrylic rubber product was put in a gear oven, and was heated at 170° C. for four hours. The resulting sheet-like cross-linked acrylic rubber product was punched by a dumbbell-shaped No. 3 to manufacture a test piece. Subsequently, using this test piece, tensile strength and elongation were measured in accordance with JIS K6251, and hardness was measured in accordance with JIS K6253 using a durometer hardness tester (type A).

(3) Hydrolysis Resistance Test

The hydrolysis resistance test was performed in conformity to JIS K6258.

As for a test piece, a sheet-like cross-linked acrylic rubber product was obtained in a similar manner to evaluation of the above-described normal physical properties, and the resulting sheet-like cross-linked acrylic rubber product was punched to manufacture a test piece for a volume change test and a test piece for a tensile test. As the test piece for a volume change test, a test piece having a vertical length of 30 mm, a horizontal length of 20 mm, and a thickness of 2.0±0.2 mm was manufactured. As the test piece for a tensile test, a dumbbell-shaped No. 3 test piece prescribed in JIS K6251 was manufactured.

The test piece for a volume change test and the test piece for a tensile test were put in a glass tube having an inner volume of 250 cc in a form of being hung on a PTFE hanger. 200 cc of a test liquid was put therein, and the test pieces were disposed such that all parts of each of the test pieces were immersed in the liquid. Subsequently, the glass tube was put in a metal pressure-resistant container. The metal pressure-resistant container was completely sealed with a metal lid provided with a PTFE packing such that a liquid did not leak from an inside thereof. In addition, the metal pressure-resistant container was put in an oven, and was heated at 120° C. for 480 hours.

Note that, as the test liquid, a liquid obtained by dissolving zinc chloride (manufactured by Sigma-Aldrich, purity: 97% or more) in distilled water and adjusting a concentration thereof to 1 wt % was used.

After being heated, the metal pressure-resistant container was taken out from the oven, and was left to cool until a temperature thereof became 100° C. or lower. Subsequently, the lid was removed, and the glass tube was taken out from the inside. The test pieces in the glass tube were taken out, were put in a gear oven, and were heated and dried at 120° C. for 70 hours.

A volume of the test piece for a volume change test obtained in this way was measured, and a volume change ratio ΔV (%) with respect to an initial volume was calculated. Subsequently, using the test piece for a tensile test, tensile strength and elongation were measured in accordance with JIS K6251, and hardness was measured in accordance with JIS K6253 using a durometer hardness tester (type A). In addition, by stretching the test piece during the tensile test, generation of a small crack (hereinafter, referred to as an elongation crack) on an edge of the test piece was observed. Note that, in Table 1, a case where no elongation crack was generated was indicated by "Good", and a case where an elongation crack was generated was indicated by "Poor".

A test piece having a volume change ratio closer to zero, larger values of tensile strength and elongation, and smaller hardness change has better hydrolysis resistance. Further, a test piece in which no elongation crack is observed has better hydrolysis resistance.

(4) Oil Resistance Test

An oil resistance test was performed in conformity to JIS K6258.

As for a test piece, a sheet-like cross-linked acrylic rubber product was obtained in a similar manner to evaluation of the above-described normal physical properties, and the resulting sheet-like cross-linked acrylic rubber product was punched to manufacture a test piece. Specifically, a test piece having a vertical length of 30 mm, a horizontal length of 20 mm, and a thickness of 2.0±0.2 mm was manufactured for a volume change test.

The test piece for a volume change test was put in a glass tube having an inner volume of 250 cc, 200 cc of a test liquid was put therein, and the test piece was disposed such that all parts of the test piece were immersed in the liquid. A glass tube was put in a heating tank, and was heated at 150° C. for 72 hours.

Note that, as the test liquid, a test lubricating oil No. 3 oil described in JIS K6258 (trade name: IRM 903, manufactured by Japan Sun Oil Company, Ltd.) was used.

After being heated, the test piece for a volume change test was taken out, and the test liquid was wiped off. Thereafter, a volume of thereof was measured, and a volume change ratio ΔV (%) with respect to an initial volume was calculated. A test piece having a smaller volume change ratio has better oil resistance.

(5) Cold Resistance Test

As a cold resistance test, a low temperature torsion test (Gehman torsion test) was performed in conformity to JIS K6261.

As for a test piece, a sheet-like cross-linked acrylic rubber product was obtained in a similar manner to evaluation of the above-described normal physical properties, and the resulting sheet-like cross-linked acrylic rubber product was punched to manufacture a test piece having a length of 40.0±2.5 mm, a width of 3.0±0.2 mm, and a thickness of 2.0±0.2 mm.

A test was performed using a Gehman stiffness tester (manufactured by Toyo Seiki Seisaku-sho, Ltd.). A temperature at which a specific modulus was 10 (hereinafter referred to as Gehman t10) was determined. A test piece having a lower value of Gehman t10 has better cold resistance.

Manufacturing Example 1

200 parts of water, 3 parts of sodium lauryl sulfate, 10 parts of methyl methacrylate, 4.5 parts of ethyl acrylate, 65 parts of n-butyl acrylate, 19 parts of 2-methoxyethyl acrylate, and 1.5 parts of mono-n-butyl maleate were put in a polymerization reactor provided with a thermometer and a stirrer. Oxygen was sufficiently removed from the reactor by performing degassing under reduced pressure and nitrogen substitution twice. Thereafter, 0.005 parts of cumene hydroperoxide and 0.002 parts of sodium formaldehyde sulfoxylate were added thereto. Emulsion polymerization was started under normal pressure at a temperature of 30° C. to cause a reaction until a polymerization conversion ratio reached 95%. The resulting emulsion polymerization liquid was coagulated with a calcium chloride solution, was washed with water, and was dried to obtain acrylic rubber (A1). The acrylic rubber (A1) had a composition of 10% by weight of methyl methacrylate units, 4.5% by weight of ethyl acrylate units, 65% by weight of n-butyl acrylate units, 19% by weight of 2-methoxyethyl acrylate units, and 1.5% by weight of mono-n-butyl maleate units. A Mooney viscosity (ML 1+4, 100° C.) of the acrylic rubber (A1) was 35.

Manufacturing Example 2

200 parts of water, 3 parts of sodium lauryl sulfate, 15 parts of methyl methacrylate, 4.5 parts of ethyl acrylate, 65 parts of n-butyl acrylate, 14 parts of 2-methoxyethyl acrylate, and 1.5 parts of mono-n-butyl maleate were put in a polymerization reactor provided with a thermometer and a stirrer. Oxygen was sufficiently removed from the reactor by performing degassing under reduced pressure and nitrogen substitution twice. Thereafter, 0.005 parts of cumene hydroperoxide and 0.002 parts of sodium formaldehyde sulfoxylate were added thereto. Emulsion polymerization was started under normal pressure at a temperature of 30° C. to cause a reaction until a polymerization conversion ratio reached 95%. The resulting emulsion polymerization liquid was coagulated with a calcium chloride solution, was washed with water, and was dried to obtain acrylic rubber (A2). The acrylic rubber (A2) had a composition of 15% by weight of methyl methacrylate units, 4.5% by weight of ethyl acrylate units, 65% by weight of n-butyl acrylate units, 14% by weight of 2-methoxyethyl acrylate units, and 1.5% by weight of mono-n-butyl maleate units. A Mooney viscosity (ML 1+4, 100° C.) of the acrylic rubber (A2) was 40.

Manufacturing Example 3

200 parts of water, 3 parts of sodium lauryl sulfate, 18 parts of methyl methacrylate, 4.5 parts of ethyl acrylate, 65 parts of n-butyl acrylate, 11 parts of 2-methoxyethyl acrylate, and 1.5 parts of mono-n-butyl maleate were put in a polymerization reactor provided with a thermometer and a stirrer. Oxygen was sufficiently removed from the reactor by performing degassing under reduced pressure and nitrogen substitution twice. Thereafter, 0.005 parts of cumene hydroperoxide and 0.002 parts of sodium formaldehyde sulfoxylate were added thereto. Emulsion polymerization was started under normal pressure at a temperature of 30° C. to cause a reaction until a polymerization conversion ratio reached 95%. The resulting emulsion polymerization liquid was coagulated with a calcium chloride solution, was washed with water, and was dried to obtain acrylic rubber (A3). The acrylic rubber (A3) had a composition of 18% by weight of methyl methacrylate units, 4.5% by weight of ethyl acrylate units, 65% by weight of n-butyl acrylate units, 11% by weight of 2-methoxyethyl acrylate units, and 1.5% by weight of mono-n-butyl maleate units. A Mooney viscosity (ML 1+4, 100° C.) of the acrylic rubber (A3) was 40.

Manufacturing Example 4

200 parts of water, 3 parts of sodium lauryl sulfate, 10 parts of methyl methacrylate, 4.5 parts of ethyl acrylate, 60 parts of n-butyl acrylate, 24 parts of 2-methoxyethyl acrylate, and 1.5 parts of mono-n-butyl maleate were put in a polymerization reactor provided with a thermometer and a stirrer. Oxygen was sufficiently removed from the reactor by performing degassing under reduced pressure and nitrogen substitution twice. Thereafter, 0.005 parts of cumene hydroperoxide and 0.002 parts of sodium formaldehyde sulfoxylate were added thereto. Emulsion polymerization was started under normal pressure at a temperature of 30° C. to cause a reaction until a polymerization conversion ratio reached 95%. The resulting emulsion polymerization liquid was coagulated with a calcium chloride solution, was washed with water, and was dried to obtain acrylic rubber (A4). The acrylic rubber (A4) had a composition of 10% by weight of methyl methacrylate units, 4.5% by weight of ethyl acrylate units, 60% by weight of n-butyl acrylate units, 24% by weight of 2-methoxyethyl acrylate units, and 1.5% by weight of mono-n-butyl maleate units. A Mooney viscosity (ML 1+4, 100° C.) of the acrylic rubber (A4) was 35.

Manufacturing Example 5

200 parts of water, 3 parts of sodium lauryl sulfate, 15 parts of methyl methacrylate, 4.5 parts of ethyl acrylate, 65 parts of n-butyl acrylate, 14 parts of 2-methoxyethyl acrylate, and 1.5 parts of vinyl chloroacetate were put in a polymerization reactor provided with a thermometer and a stirrer. Oxygen was sufficiently removed from the reactor by performing degassing under reduced pressure and nitrogen substitution twice. Thereafter, 0.005 parts of cumene hydroperoxide and 0.002 parts of sodium formaldehyde sulfoxylate were added thereto. Emulsion polymerization was started under normal pressure at a temperature of 30° C. to cause a reaction until a polymerization conversion ratio reached 95%. The resulting emulsion polymerization liquid was coagulated with a calcium chloride solution, was washed with water, and was dried to obtain acrylic rubber (A5). The acrylic rubber (A5) had a composition of 15% by weight of methyl methacrylate units, 4.5% by weight of ethyl acrylate units, 65% by weight of n-butyl acrylate units, 14% by weight of 2-methoxyethyl acrylate units, and 1.5% by weight of vinyl chloroacetate units. A Mooney viscosity (ML 1+4, 100° C.) of the acrylic rubber (A5) was 40.

Manufacturing Example 6

200 parts of water, 3 parts of sodium lauryl sulfate, 10 parts of methyl methacrylate, 23.5 parts of ethyl acrylate, 65 parts of n-butyl acrylate, and 1.5 parts of mono-n-butyl maleate were put in a polymerization reactor provided with a thermometer and a stirrer. Oxygen was sufficiently removed from the reactor by performing degassing under reduced pressure and nitrogen substitution twice. Thereafter, 0.005 parts of cumene hydroperoxide and 0.002 parts of sodium formaldehyde sulfoxylate were added thereto. Emulsion polymerization was started under normal pressure at a temperature of 30° C. to cause a reaction until a polymerization conversion ratio reached 95%. The resulting emulsion polymerization liquid was coagulated with a calcium chloride solution, was washed with water, and was dried to obtain acrylic rubber (A6). The acrylic rubber (A6) had a composition of 10% by weight of methyl methacrylate units, 23.5% by weight of ethyl acrylate units, 65% by weight of n-butyl acrylate units, and 1.5% by weight of mono-n-butyl maleate units. A Mooney viscosity (ML 1+4, 100° C.) of the acrylic rubber (A6) was 40.

Manufacturing Example 7

200 parts of water, 3 parts of sodium lauryl sulfate, 5 parts of methyl methacrylate, 4.5 parts of ethyl acrylate, 65 parts of n-butyl acrylate, 24 parts of 2-methoxyethyl acrylate, and 1.5 parts of mono-n-butyl maleate were put in a polymerization reactor provided with a thermometer and a stirrer. Oxygen was sufficiently removed from the reactor by performing degassing under reduced pressure and nitrogen substitution twice. Thereafter, 0.005 parts of cumene hydroperoxide and 0.002 parts of sodium formaldehyde sulfoxylate were added thereto. Emulsion polymerization was started under normal pressure at a temperature of 30° C. to cause a reaction until a polymerization conversion ratio reached 95%. The resulting emulsion polymerization liquid was coagulated with a calcium chloride solution, was washed with water, and was dried to obtain acrylic rubber (A7). The acrylic rubber (A7) had a composition of 5% by weight of methyl methacrylate units, 4.5% by weight of ethyl acrylate units, 65% by weight of n-butyl acrylate units, 24% by weight of 2-methoxyethyl acrylate units, and 1.5% by weight of mono-n-butyl maleate units. A Mooney viscosity (ML 1+4, 100° C.) of the acrylic rubber (A7) was 35.

Example 1

60 parts of HAF carbon black (trade name "SEAST 3", manufactured by Tokai Carbon Co., filler), 1 part of stearic acid, 1 part of an ester-based wax (trade name "Greg G-8205", manufactured by Dainippon Ink and chemicals, Inc., slip agent), and 4,4'-di-(α,α-dimethylbenzyl) diphenylamine (trade name: Nocrac CD, manufactured by Ouchi Shinko chemical industry Co., Ltd., anti-aging agent) were added to 100 parts of the acrylic rubber (A1), and were mixed using a Banbury mixer at 50° C. for five minutes. Subsequently, the resulting mixture was transferred to a roll at 50° C. By blending 0.5 parts of hexamethylenediamine carbamate (trade name: Diak #1, manufactured by Dupont Elastomer Co., cross-linking agent) and 2 parts of 1,3-di-o-tolyl guanidine (trade name: Nocceler DT, manufactured by Ouchi Shinko chemical industrial Co., Ltd., cross-linking accelerator) to the mixture and kneading the resulting mixture, an acrylic rubber composition was obtained.

A test piece was obtained using the resulting acrylic rubber composition by the above method, and normal physical properties (tensile strength, elongation, and hardness), hydrolysis resistance, oil resistance, and cold resistance were evaluated. The results are shown in Table 1.

Example 2

An acrylic rubber composition was obtained by a similar method to Example 1 except for using the acrylic rubber (A2) in place of the acrylic rubber (A1). A test piece was obtained using the resulting acrylic rubber composition by the above method, and normal physical properties (tensile strength, elongation, and hardness), hydrolysis resistance, oil resistance, and cold resistance were evaluated. The results are shown in Table 1.

Example 3

An acrylic rubber composition was obtained by a similar method to Example 1 except for using the acrylic rubber (A3) in place of the acrylic rubber (A1). A test piece was obtained using the resulting acrylic rubber composition by the above method, and normal physical properties (tensile strength, elongation, and hardness), hydrolysis resistance, oil resistance, and cold resistance were evaluated. The results are shown in Table 1.

Example 4

An acrylic rubber composition was obtained by a similar method to Example 1 except for using the acrylic rubber (A4) in place of the acrylic rubber (A1). A test piece was obtained using the resulting acrylic rubber composition by the above method, and normal physical properties (tensile strength, elongation, and hardness), hydrolysis resistance, oil resistance, and cold resistance were evaluated. The results are shown in Table 1.

Example 5

An acrylic rubber composition was obtained by a similar method to Example 1 except for using the acrylic rubber (A5) in place of the acrylic rubber (A1), and using 0.5 parts of 2,4,6-trimercapto-s-triazine (trade name: ZISNET-F, manufactured by Sanyo chemical Industries, Ltd., cross-linking agent), 1.5 parts of zinc dibutyldithiocarbamate (trade name: Nocceler BZ, manufactured by Ouchi Shinko chemical industrial Co., Ltd., cross-linking accelerator), 0.3 parts of diethyl thiourea (trade name: Nocceler EUR, manufactured by Ouchi Shinko chemical industrial Co., Ltd., cross-linking accelerator), and 0.2 parts of N-(cyclohexylthio) phthalimide (trade name: retarder CTP, manufactured by Ouchi Shinko chemical industrial Co., scorch preventer) in place of 0.5 parts of hexamethylenediamine carbamate (trade name: Diak #1, manufactured by Dupont Elastomer Co., cross-linking agent) and 2 parts of 1,3-di-o-tolyl guanidine (trade name: Nocceler DT, manufactured by Ouchi Shinko chemical industrial Co., Ltd., cross-linking accelerator).

A test piece was obtained using the resulting acrylic rubber composition by the above method, and normal physical properties (tensile strength, elongation, and hardness), hydrolysis resistance, oil resistance, and cold resistance were evaluated. The results are shown in Table 1.

Comparative Example 1

An acrylic rubber composition was obtained by a similar method to Example 1 except for using the acrylic rubber (A6) in place of the acrylic rubber (A1). A test piece was obtained using the resulting acrylic rubber composition by the above method, and normal physical properties (tensile strength, elongation, and hardness), hydrolysis resistance, oil resistance, and cold resistance were evaluated. The results are shown in Table 1.

Comparative Example 2

An acrylic rubber composition was obtained by a similar method to Example 1 except for using the acrylic rubber (A7) in place of the acrylic rubber (A1). A test piece was obtained using the resulting acrylic rubber composition by the above method, and normal physical properties (tensile strength, elongation, and hardness), hydrolysis resistance, oil resistance, and cold resistance were evaluated. The results are shown in Table 1.

TABLE 1

|  | Ex. 1 | Ex. 2 | Ex. 3 | Ex. 4 | Ex. 5 | Comp. Ex. 1 | Comp. Ex. 2 |
| --- | --- | --- | --- | --- | --- | --- | --- |
| Acrylic rubber composition (% by weight) | Acrylic rubber (A1) | Acrylic rubber (A2) | Acrylic rubber (A3) | Acrylic rubber (A4) | Acrylic rubber (A5) | Acrylic rubber (A6) | Acrylic rubber (A7) |
| Methyl methacrylate unit | 10 | 15 | 18 | 10 | 15 | 10 | 5 |
| Ethyl acrylate unit | 4.5 | 4.5 | 4.5 | 4.5 | 4.5 | 23.5 | 4.5 |
| n-Butyl acrylate unit | 65 | 65 | 65 | 60 | 65 | 65 | 65 |

TABLE 1-continued

|  | Ex. 1 | Ex. 2 | Ex. 3 | Ex. 4 | Ex. 5 | Comp. Ex. 1 | Comp. Ex. 2 |
|---|---|---|---|---|---|---|---|
| 2-methoxyethyl acrylate unit | 19 | 14 | 11 | 24 | 14 | 0 | 24 |
| Mono-n-butyl maleate unit | 1.5 | 1.5 | 1.5 | 1.5 | — | 1.5 | 1.5 |
| Vinyl chloroacetate unit | — | — | — | — | 1.5 | — | — |
| Acrylic rubber composition blending (parts) | | | | | | | |
| Acrylic rubber (A1) | 100 | — | — | — | — | — | — |
| Acrylic rubber (A2) | — | 100 | — | — | — | — | — |
| Acrylic rubber (A3) | — | — | 100 | — | — | — | — |
| Acrylic rubber (A4) | — | — | — | 100 | — | — | — |
| Acrylic rubber (A5) | — | — | — | — | 100 | — | — |
| Acrylic rubber (A6) | — | — | — | — | — | 100 | — |
| Acrylic rubber (A7) | — | — | — | — | — | — | 100 |
| HAF carbon black (filler) | 60 | 60 | 60 | 60 | 60 | 60 | 60 |
| Stearic acid | 1 | 1 | 1 | 1 | 1 | 1 | 1 |
| Ester-based wax (slip agent) | 1 | 1 | 1 | 1 | 1 | 1 | 1 |
| 4,4'-di-($\alpha,\alpha$-dimethylbenzyl) diphenylamine (anti-aging agent) | 2 | 2 | 2 | 2 | 2 | 2 | 2 |
| Hexamethylenediamine carbamate (cross-linking agent) | 0.5 | 0.5 | 0.5 | 0.5 | — | 0.5 | 0.5 |
| 1,3-di-o-tolyl guanidine (cross-linking accelerator) | 2 | 2 | 2 | 2 | — | 2 | 2 |
| 2,4,6-trimercapto-s-triazine (cross-linking agent) | — | — | — | — | 0.5 | — | — |
| Zinc dibutyldithiocarbamate (cross-linking accelerator) | — | — | — | — | 1.5 | — | — |
| Diethyl thiourea (cross-linking accelerator) | — | — | — | — | 0.3 | — | — |
| N-(cyclohexylthio) phthalimide (scorch preventer) | — | — | — | — | 0.2 | — | — |
| Normal physical properties | | | | | | | |
| Tensile strength (MPa) | 11.3 | 12.4 | 13.0 | 11.9 | 12.8 | 12.9 | 11.4 |
| Elongation (%) | 230 | 280 | 290 | 240 | 300 | 290 | 210 |
| Hardness (Duro A) | 74 | 73 | 75 | 73 | 74 | 72 | 73 |
| Hydrolysis resistance test (1 wt % $ZnCl_2$ aqueous solution, 120° C. × 480 hours + drying 120° C. × 70 hours) | | | | | | | |
| Volume change ratio $\Delta V$ (%) | −9.8 | −6.7 | −5.2 | −10.3 | −7.0 | −8.4 | −12.9 |
| Tensile strength (MPa) | 12.8 | 13.5 | 13.7 | 12.3 | 11.8 | 14.2 | 16.3 |
| Elongation (%) | 100 | 160 | 170 | 100 | 180 | 140 | 60 |
| Hardness (Duro A) | 94 | 92 | 92 | 93 | 90 | 89 | 96 |
| Elongation crack | Good | Good | Good | Good | Good | Good | Poor |
| Oil resistance test (IRM 903, 150° C. × 72 hours) | | | | | | | |
| Volume change ratio $\Delta V$ (%) | +37.0 | +39.1 | +39.5 | +30.2 | +39.3 | +46.4 | +34.5 |
| Cold resistance test (Gehman torsion test) | | | | | | | |
| t10 (° C.) | −29.7 | −24.9 | −22.3 | −29.2 | −25.2 | −26.4 | −34.6 |

As indicated in Table 1, a cross-linked acrylic rubber product obtained by using an acrylic rubber containing 10 to 20%, preferably 10 to 18% of methyl methacrylate units, 15% or less, preferably 5% or less of ethyl acrylate units, 60 to 80%, preferably 60% to 65% of n-butyl acrylate units, 10 to 30%, preferably 11 to 24% of 2-methoxyethyl acrylate units, and 0.5 to 5%, preferably 1 to 3% of cross-linking site monomer units has excellent hydrolysis resistance, and has an excellent balance between oil resistance and cold resistance (Examples 1 to 5).

On the other hand, a cross-linked acrylic rubber product obtained by using an acrylic rubber containing 10% of methyl methacrylate units, 65% of n-butyl acrylate units, and no 2-methoxyethyl acrylate unit has excellent hydrolysis resistance, but has poor oil resistance (Comparative Example 1). Further, a cross-linked acrylic rubber product obtained by using an acrylic rubber containing 5% of methyl methacrylate units has an excellent balance between oil resistance and cold resistance, but has poor hydrolysis resistance (Comparative Example 2).

The invention claimed is:

1. An acrylic rubber comprising (a) methyl methacrylate units, (b) ethyl acrylate units, (c) n-butyl acrylate units, (d) 2-methoxyethyl acrylate units, and (e) cross-linking site monomer units, wherein
   the acrylic rubber contains
   10 to 20% by weight of (a) the methyl methacrylate units,
   15% by weight or less of (b) the ethyl acrylate units,
   60 to 80% by weight of (c) the n-butyl acrylate units,
   10 to 30% by weight of (d) the 2-methoxyethyl acrylate units, and
   0.5 to 5% by weight of (e) the cross-linking site monomer units.

2. The acrylic rubber according to claim 1, wherein the cross-linking site monomer has at least one of a carboxyl group, an active chlorine group, and an epoxy group.

3. An acrylic rubber composition comprising the acrylic rubber according to claim 1, and a cross-linking agent.

4. The acrylic rubber composition according to claim 3, wherein the cross-linking agent is a polyvalent amine compound or a triazine thiol derivative.

5. A cross-linked acrylic rubber product obtained by cross-linking the acrylic rubber composition according to claim 3.

6. A seal member formed of a cross-linked acrylic rubber product obtained by cross-linking an acrylic rubber composition containing:

an acrylic rubber containing (a) methyl methacrylate units, (b) ethyl acrylate units, (c) n-butyl acrylate units, (d) 2-methoxyethyl acrylate units, and (e) cross-linking site monomer units, wherein the acrylic rubber contains 10 to 18% by weight of (a) the methyl methacrylate units, 5% by weight or less of (b) the ethyl acrylate units, 60 to 65% by weight of (c) the n-butyl acrylate units, 11 to 24% by weight of (d) the 2-methoxyethyl acrylate units, and 1 to 3% by weight of (e) the cross-linking site monomer units; and a cross-linking agent, wherein the seal member is used in an environment in contact with an oil for an engine containing 500 to 2000 ppm of water and 1000 to 5000 ppm of zinc.

7. The seal member according to claim 6, wherein the seal member is any one of a head cover gasket, a plug tube gasket, a cam journal orifice gasket, a spool valve gasket, an oil pressure sensor gasket, a cam shaft thrust gasket, a valve timing control valve gasket, a valve timing control filter gasket, a cylinder head plug gasket, an oil filter cartridge gasket, an oil filter base gasket, a baffle plate gasket, a gallery cap bolt gasket, a lower block orifice gasket, a positive crankcase ventilation valve gasket, an oil path orifice gasket, an oil level pipe gasket, an oil pump gasket, a chain case gasket, an oil filter gasket, an oil cooler gasket, and an oil pan gasket.

8. The seal member according to claim 6, wherein the cross-linking site monomer has at least one of a carboxyl group, an active chlorine group, and an epoxy group.

9. The seal member according to claim 6, wherein the cross-linking agent is a polyvalent amine compound or a triazine thiol derivative.

* * * * *